US006864730B2

United States Patent
Reiner et al.

(10) Patent No.: US 6,864,730 B2
(45) Date of Patent: Mar. 8, 2005

(54) CLOCKED INTEGRATED SEMICONDUCTOR CIRCUIT AND METHOD FOR OPERATING SUCH A CIRCUIT

(75) Inventors: Robert Reiner, Neubiberg (DE); Holger Sedlak, Egmating (DE)

(73) Assignee: Infineon Technologies AG, Munich (DE)

( * ) Notice: Subject to any disclaimer, the term of this patent is extended or adjusted under 35 U.S.C. 154(b) by 873 days.

(21) Appl. No.: 09/771,886

(22) Filed: Jan. 29, 2001

(65) Prior Publication Data

US 2001/0038637 A1 Nov. 8, 2001

Related U.S. Application Data

(63) Continuation of application No. PCT/EP99/05391, filed on Jul. 27, 1999.

(30) Foreign Application Priority Data

Jul. 29, 1998 (EP) .............................................. 98114199

(51) Int. Cl.[7] .............................................. H03K 3/84
(52) U.S. Cl. ...................................... 327/164; 713/200
(58) Field of Search ................................ 327/100, 164, 327/291, 293, 295–297; 713/164, 166, 190, 200

(56) References Cited

U.S. PATENT DOCUMENTS 4,932,053 A    6/1990   Fruhauf et al.
6,279,116 B1 *   8/2001   Lee .............................. 713/601

FOREIGN PATENT DOCUMENTS

JP       60 231 285      11/1985
JP       2-199561        8/1990

* cited by examiner

*Primary Examiner*—Kenneth B. Wells
(74) *Attorney, Agent, or Firm*—Laurence A. Greenberg; Werner H. Stemer; Ralph E. Locher

(57) ABSTRACT

An integrated semiconductor circuit having a number of circuit units which are driven by a clock signal and can be operated both in parallel and in series is provided. A connection supplying the clock signal is connected to the clock input of the respective circuit units via respective controllable switching devices. The control inputs of the switching devices are connected to an output of a random signal generator, so that a circuit unit is operated in parallel or in series with one or more of the other circuit units on the basis of the random signal. A method of operating an integrated semiconductor circuit is also provided.

10 Claims, 3 Drawing Sheets

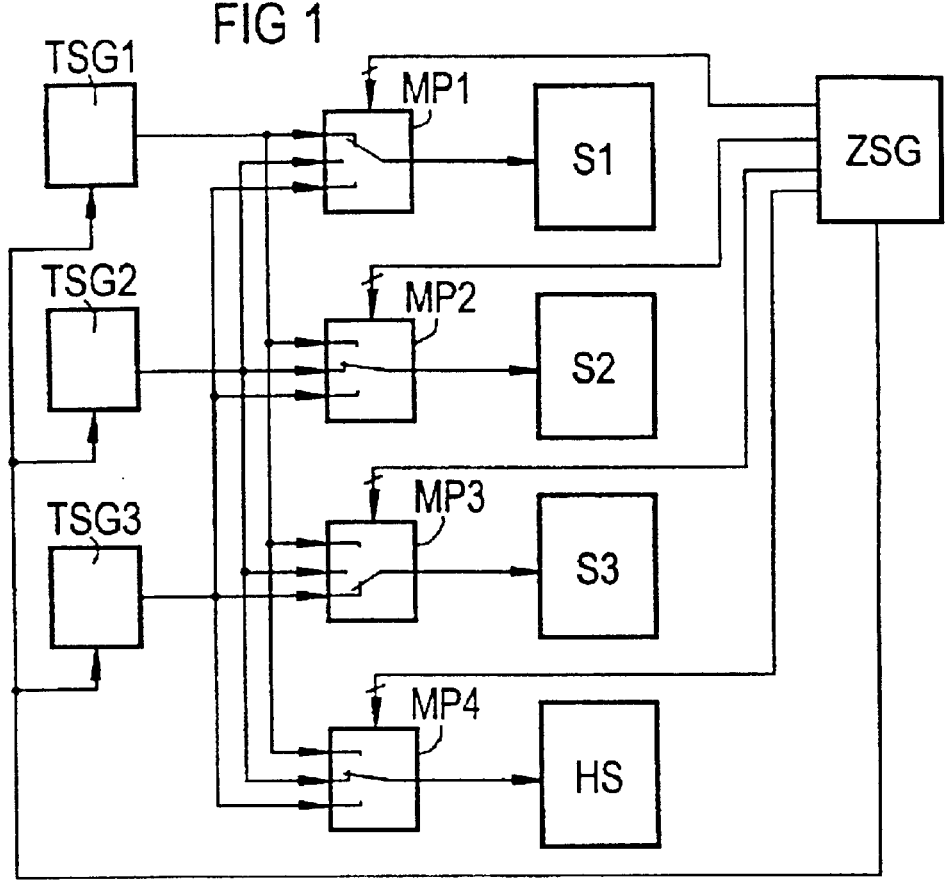
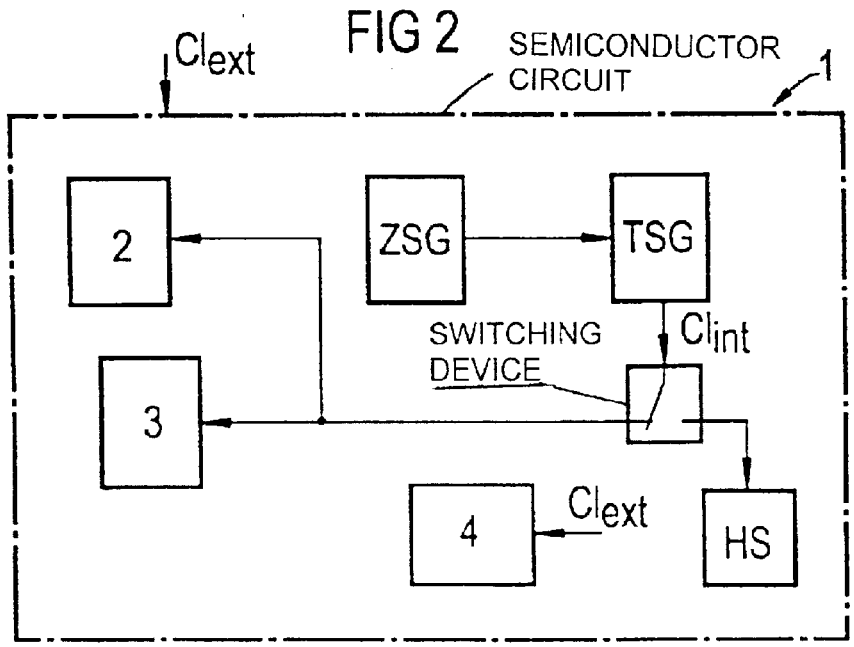

CLOCK SIGNAL GENERATOR

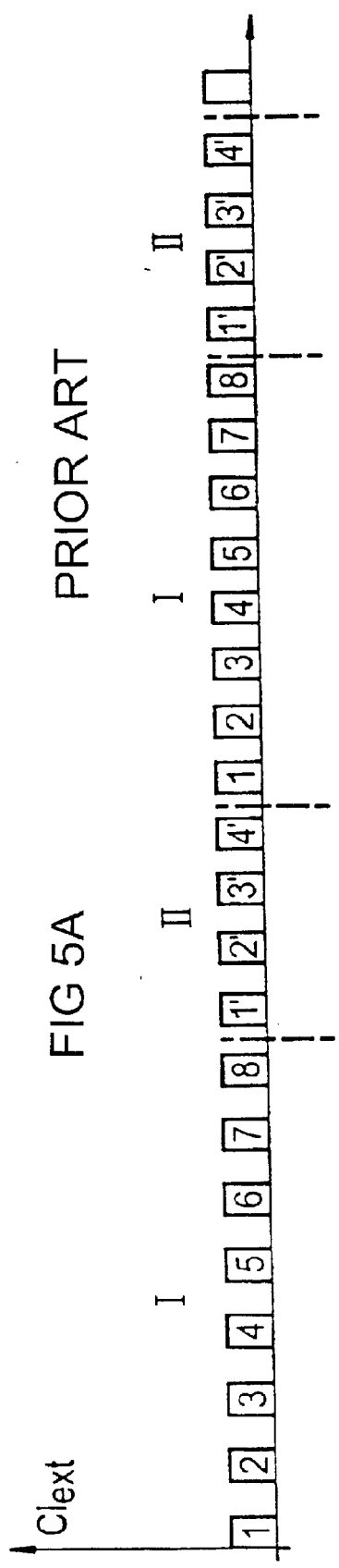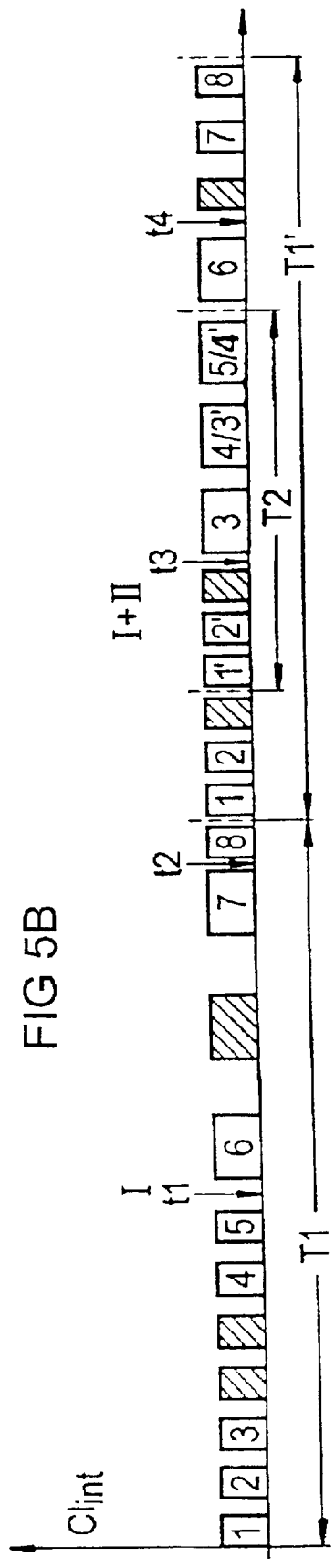

CLOCKED INTEGRATED SEMICONDUCTOR CIRCUIT AND METHOD FOR OPERATING SUCH A CIRCUIT

CROSS-REFERENCE TO RELATED APPLICATION

This application is a continuation of copending International Application No. PCT/EP99/05391, filed Jul. 27, 1999, which designated the United States.

BACKGROUND OF THE INVENTION

Field of the Invention

The invention relates to an integrated semiconductor circuit having a number of circuit units which are driven by a clock signal and can be operated both in parallel and in series. The invention also relates to methods for operating such integrated semiconductor circuits.

Integrated semiconductor circuits are usually used for signal processing and data processing and are implemented based on digital circuit technology. Such digital circuits usually require a clock signal in order to be able to operate synchronously and according to a routine determined by the respective application. Often, particular operations are processed on the basis of defined protocols. These protocols require a particular number of clock signal periods.

In many applications, such as in integrated semiconductor circuits for smart cards, the necessary clock signal is supplied externally via a connection pin. In safety-critical applications, which are, in particular, applications in which the signals to be processed represent monetary values or access authorizations, potential hackers have a great deal of interest in obtaining information about the particular operating procedure, in order to be able to influence the result. This information can be gained from the duration of individual operations or from the number of clock signal periods required for them, particularly if there is already some knowledge about the type of the operations.

Integrated semiconductor circuits for smart cards usually include a number of circuit units, such as a processor, a coprocessor, a nonvolatile memory with associated programming logic, an input/output circuit, such as a UART (Universal Asynchronous Receiver/Transmitter) and other devices. In the interest of as high a processing speed as possible, as many circuit units as possible should operate simultaneously, so that, in many cases, attempts are made to get the processor to perform a task while data are being written to the nonvolatile memory, and likewise to get the coprocessor to operate simultaneously while the UART is receiving data from outside or is outputting data to the outside.

The operations which are being carried out draw power from the supply voltage, primarily during the switching edges of the clock signal, so that, by observing or monitoring the current flowing into the integrated semiconductor circuit, it is first possible to ascertain the instant of the switching edges of the clock signal, insofar as this clock signal is supplied externally, but it is secondly possible to ascertain the duration of individual operations and to establish, from prolonged monitoring, when given operations take place. Under some circumstances, knowledge of the overall operation can then even be used to infer the individual operations and hence the processing structure of the integrated semiconductor circuit.

SUMMARY OF THE INVENTION

It is accordingly an object of the invention to provide an integrated circuit configuration and methods of operating integrated circuit configurations which overcome the above-mentioned disadvantages of the heretofore-known circuit configurations and methods of this general type and which prevent any possibility to infer a type of operation taking place from counting current spikes.

With the foregoing and other objects in view there is provided, in accordance with the invention, an integrated semiconductor circuit, including:

a random signal generator having an output for supplying a random signal;

at least one controllable switching device having a control input connected to the output of the random signal generator;

a plurality of circuit units having respective clock inputs;

at least one terminal for supplying at least one clock signal, the clock inputs of the circuit units being connected to the at least one terminal via the at least one controllable switching device; and the circuit units being controlled by the at least one clock signal and being configured to be operable in parallel and in series, at least one of the circuit units selectively operating in parallel and in series with at least another one of the circuit units based on the random signal.

In other words, the object of the invention is achieved by virtue of the fact that, in an integrated semiconductor circuit, a connection or terminal supplying the clock signal is connected to the clock input of the respective circuit units via respective controllable switching devices, and that the control inputs of the switching devices are connected to an output of a random signal generator, so that a circuit unit is operated in parallel or in series with one or more of the other circuit units on the basis of the random signal.

Thus, in the semiconductor circuit according to the invention, various circuit units are operated sometimes simultaneously, sometimes in succession, on the basis of a random signal, as a result of a clock signal being either supplied or not supplied to them. In this context, it is also possible for an operation in a first circuit unit to be interrupted and for another operation in another circuit unit to start or be continued, in order for the first operation then to be carried out subsequently or simultaneously. The effect achieved by this is that a particular operation, when repeated, almost never has the same duration, and it is thus also not possible to establish that it is the same operation.

In an advantageous embodiment, the connection or terminal supplying the clock signal is the output of a controllable clock signal generator whose control input is connected to the output of a random signal generator, so that the instant of a switching edge of the clock signal varies on the basis of the random signal.

In this case, it is particularly advantageous if the fluctuations in the random signal are relatively slow in relation to the mean period duration of the clock signal, but if the amplitude of the random signal fluctuates so much from operation to operation that identical operations are carried out at a different clock frequency and thus always have a different duration. This makes detecting the switching edges of the clock signal much more difficult.

In this embodiment of the integrated semiconductor circuit, the relationship between an externally applied clock signal and the clocking inside the circuit is eliminated. On account of being driven by the random signal generator, the internal clock signal generator generates an irregular clock signal, so that it is virtually impossible to associate particular operations with particular time intervals.

In a further embodiment of the invention, the integrated semiconductor circuit contains at least two clock signal generators with different frequencies, and a first number of circuit units is operated with a first clock signal and a second number of circuit units is operated with a second clock signal. Should the occasion arise, further circuit units can be operated with further clock signals. Particularly when operations are nested in circuit units clocked at different frequencies, further randomization of operation durations is achieved.

In one particularly advantageous embodiment using this principle, the individual switching devices are in the form of multiplexers via which each clock signal can be supplied to each circuit unit. The multiplexers are driven by a random signal or by various random signals, so that a particular circuit unit can be operated with various clock signals, which, moreover, may also have randomly fluctuating frequencies.

In one embodiment of the invention, a clock signal generator is formed through the use of a controlled, in particular voltage controlled, oscillator.

In addition, a clock signal generator may be implemented using a phase locked loop which has a controllable or adjustable frequency divider, used to inject the frequency fluctuations into the clock signal.

The random signal generator may be a random number generator which has an arbitrary number of digital outputs, in order thus to drive the frequency divider of a phase locked loop directly. Alternatively, the random number generator may have a D/A converter connected downstream, which can be used, by way of example, to drive the control input of an oscillator. Usually a random number generator has just one output, so that the oscillator is merely changed over between two frequencies.

Alternatively, a frequency divider driven by a random number generator may be connected downstream of a stable oscillator. In principle, the aim is to generate a frequency-modulated clock signal in which the degree of modulation is subject to random fluctuations. It is beneficial in this context if the mean period duration of the modulation signal generated by the random signal generator is approximately the mean duration of the operations taking place in the integrated semiconductor circuit.

In one particularly advantageous embodiment of the invention, at least one of the circuit units is in the form of an auxiliary circuit unit which, although it has approximately the same current consumption as the other circuit units, has no function of importance to the integrated semiconductor circuit. Changing over to this auxiliary circuit unit under the control of a random signal before and/or during and/or after operations which take place in circuit units of the integrated semiconductor circuit and each require a defined number of clock signal periods results in the duration of these operations being randomly modified, with no possibility of this being recognized from the current consumption.

It is particularly beneficial if, during an operation in one circuit unit, there is both a random changeover to the auxiliary circuit unit, and one or more circuit units are started or stopped randomly.

With the objects of the invention in view there is also provided, a method for operating a clocked integrated semiconductor circuit, the method includes the steps of:

executing, in circuit units of an integrated semiconductor circuit, operations which each require a respective given number of clock signal periods; and determining, based on a random signal, a further number of clock signal periods;

supplying the further number of clock signal periods to an auxiliary circuit unit having substantially the same current consumption as the circuit units; and performing the supplying step prior and/or during and/or subsequent to the executing step.

In other words, a method for operating a clocked integrated semiconductor circuit is characterized in that, before and/or during and/or after operations which take place in circuit units of the integrated semiconductor circuit and which each require a defined number of clock signal periods, a further number of clock signal periods, which is determined by a random signal, is supplied to an auxiliary circuit unit with approximately the same current consumption as the circuit units.

With the objects of the invention in view there is also provided, a method for operating a clocked integrated semiconductor circuit, the method includes the steps of:

executing, in a first circuit unit of an integrated semiconductor circuit, an operation which requires a given number of clock signal periods of a clock signal; and activating, during the executing step, at least a second circuit unit for a duration of time periods determined by a random signal by supplying one of the clock signal and a further clock signal to the second circuit unit.

In other words, a method for operating a clocked integrated semiconductor circuit is characterized in that, during an operation which takes place in a first circuit unit of the integrated semiconductor circuit and requires a defined number of clock signal periods, at least one other circuit unit is started for the duration of time periods determined by a random signal by supplying the same or another clock signal.

According to another mode of the invention, during at least one of the time periods determined by the random signal, the operation executed in the first circuit unit is interrupted.

Other features which are considered as characteristic for the invention are set forth in the appended claims.

Although the invention is illustrated and described herein as embodied in a clocked integrated semiconductor circuit and methods for operating such a circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a basic block diagram of an integrated semiconductor circuit according to the invention;

FIG. 2 is basic block diagram of a further integrated semiconductor circuit according to the invention;

FIG. 5A is a time sequence of operations with an external clock signal; and

FIG. 5B is a time sequence of operations in accordance with the invention.

DESCRIPTION OF THE PREFERRED EMBODIMENTS

Referring now to the figures of the drawings in detail and first, particularly, to FIG. 1 thereof, there is shown a basic circuit diagram of an integrated semiconductor circuit according to the invention, having three circuit units S1, S2 and S3. In addition, an auxiliary circuit unit HS is shown. There are three clock signal generators TSG1, TSG2, TSG3 present, whose output signals can be supplied to the circuit units S1 to S3 and HS via respective multiplexers MP1, MP2, MP3, MP4. The multiplexers MP1 to MP4 are driven by output signals from a random signal generator ZSG. In addition, a further output signal from the random signal generator ZSG controls the clock signal generators TSG1 to TSG3.

Thus, as indicated by the basic illustration in FIG. 1, the integrated semiconductor circuit according to the invention can be used to operate various circuit units S1 to S3 and HS with clock signals or timing signals of different frequency in series or in parallel under random control. In particular, by changing over to the auxiliary circuit unit HS while an operation is taking place in a functional circuit unit, dummy clock cycles can be added, so that, to an external observer, the operation seems to take longer than it actually is. It is also possible to hide relatively short operations in a longer operation by clocking two circuit units in parallel.

FIG. 2 shows, as indicated by a dot-dash line, an integrated semiconductor circuit 1 including, amongst other things, circuits 2, 3, such as memory circuits or logic circuits. These circuits 2, 3 are clocked by an internal clock signal $Cl_{int}$. This internal clock signal is generated by a clock signal generator TSG. The clock signal generator TSG has a control input which is connected to the output of a random signal generator ZSG. The integrated semiconductor circuit is externally supplied with an external clock signal $Cl_{ext}$ which, in the example illustrated, is supplied as clock signal to a circuit 4, which is likewise contained in the integrated semiconductor circuit 1. The additional use of the external clock signal $Cl_{ext}$ allows operations in various circuits to take place at different clock frequencies. This makes it even more difficult to associate operations with particular time periods. In addition, there are circuit units, such as input/output circuits, which have to be clocked with an external clock signal since they receive data from an external terminal and need to operate synchronously with this terminal.

The clock signal generator TSG can be in the form of a voltage controlled oscillator and can be driven by a random signal generator ZSG with an analog output.

Figure 3:
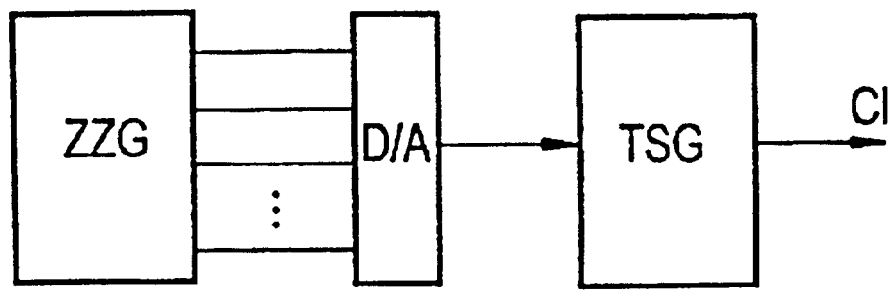
FIG. 3 is a block diagram of an embodiment a clock signal generator having a digital random number generator.

As FIG. 3 shows, the random signal generator may also be in the form of a random number generator ZZG with an arbitrary number of digital outputs. In the case of a clock signal generator TSG with an analog input, as shown in FIG. 3, these outputs are connected to a digital/analog converter D/A whose analog output signal drives the control input of the clock signal generator TSG.

Figure 4:
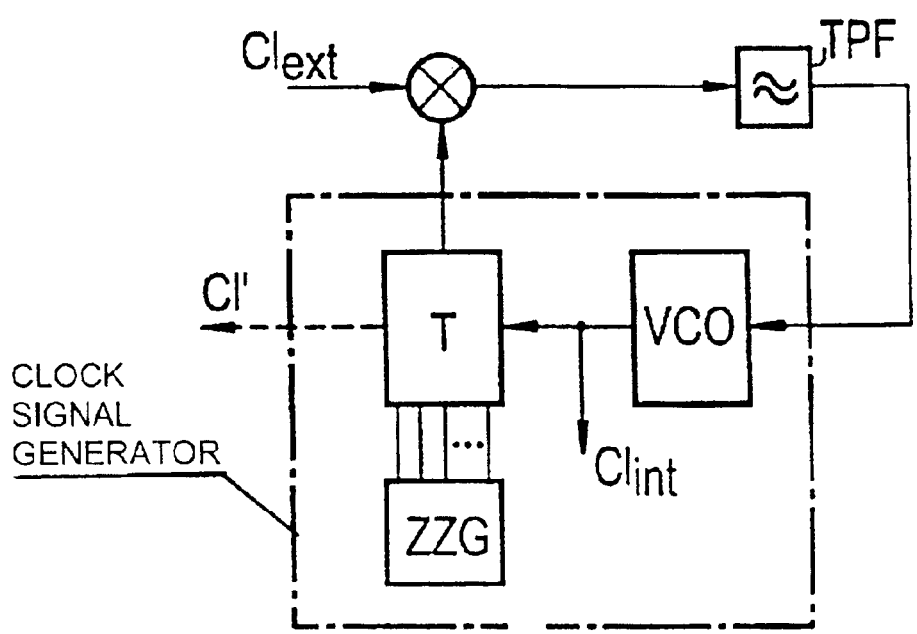
FIG. 4 is a block diagram of an embodiment of a clock signal generator having a phase locked loop.

In principle, it is also possible for a controllable frequency divider driven by the random number generator ZZG to be connected downstream of a conventional clock signal generator. This would also make it possible to generate an internal clock signal $Cl_{int}$ having a frequency or period duration which fluctuates over time. Such an illustrative embodiment is shown in FIG. 4 inside a broken line. The clock signal Cl' to be used in this case is indicated by an arrow, which is likewise broken.

FIG. 4 also shows an addition to the clock signal generator configured with a controllable divider T, to form a phase locked loop. In this context, the output signal from the divider T is supplied, like the external clock signal $Cl_{ext}$, to a phase detector whose output signal is supplied to the control input of the controllable oscillator VCO via a low pass filter TPF. In this case, the output signal from the controllable oscillator VCO supplies the internal clock signal $Cl_{int}$, which fluctuates on the basis of the random number generator ZZG.

FIGS. 5A and 5B show the different durations of two operations I and II for a conventional external clock signal $Cl_{ext}$ and for an internal clock signal $Cl_{int}$ according to the invention. The external clock signal $Cl_{ext}$ shown in FIG. 5A has a constant frequency. A first operation I will last eight periods and a second operation II will last four periods. As can be clearly seen from FIG. 5A, a first operation I would always take the same time, as would a second operation II. A hacker who, by way of example, uses the current drawn to ascertain when operations take place in the semiconductor circuit could, with recurring time periods of particular duration, infer that an operation which has already taken place is involved.

By contrast, FIG. 5B shows an internal clock signal $Cl_{int}$ with a randomly fluctuating frequency. Thus, the period duration in this case changes at instants t1, t2, t3 and t4. In addition, shaded periods of the clock signal $Cl_{int}$ show instances of changing over to an auxiliary circuit unit, that is to say, the addition of dummy clock cycles. The individual clock periods of operation I are identified by numerals 1 to 8. As can be seen, operation I first has a duration T1, and, over this duration T1, the frequency of the clock signal $Cl_{int}$ has been changed over at instants t1 and t2, and three dummy periods have been added. The duration T1 thus bears no relation to the actual duration of operation I.

Subsequently to the first operation I, a second operation I starts, whose clock periods are likewise identified by numerals 1 to 8. In this case, a dummy clock cycle is added after the second clock period, and there is then a changeover to another circuit unit, in which operation II takes place.

The clock periods of the latter are identified by numerals 1' to 4'. After two clock periods of operation II have elapsed, a dummy clock cycle is likewise added. Next, at an instant t3, the frequency is first changed over and, secondly, there is a changeover to operation I again. In the next two clock periods, operations I and II then run in parallel. Operation II has then ended after a duration T2, while the second operation I continues and has not ended until after a duration T1'.

As before, operations I and II require eight and four period durations of the clock signal, respectively. This gives total durations of T1 and T1' for the respective first operations I, and of T2 for the second operations II. As can be seen in FIG. 5B, the durations T1 and T1' have different lengths, while operation II is not evident as an individual operation at all, so that a hacker is not able to recognize which operations are involved.

The integrated semiconductor circuit according to the invention thus provides a very simple but effective way of preventing the content of particular operations from being inferred by ascertaining their durations.

We claim:

1. An integrated semiconductor circuit, comprising:
   a random signal generator having an output for supplying a random signal;
   at least one controllable switching device having a control input connected to said output of said random signal generator;
   a plurality of circuit units having respective clock inputs;
   at least one terminal for supplying at least one clock signal, said clock inputs of said circuit units being connected to said at least one terminal via said at least one controllable switching device; and said circuit units being controlled by the at least one clock signal and being configured to be operable in parallel and in series, at least one of said circuit units selectively operating in parallel and in series with at least another one of said circuit units based on the random signal.

2. The integrated semiconductor circuit according to claim 1, including:

at least one controllable clock signal generator having a control input connected to said output of said random signal generator, said at least one controllable clock signal generator being controlled such that an instant of a switching edge of the at least one clock signal varies based on the random signal; and said at least one terminal for supplying the at least one clock signal being a clock signal output of said at least one controllable clock signal generator.

3. The integrated semiconductor circuit according to claim 1, wherein:

said at least one terminal for supplying the at least one clock signal includes at least a first terminal for supplying a first clock signal and a second terminal for supplying a second clock signal; and a first number of said circuit units are operated with the first clock signal and a second number of said circuit units are operated with the second clock signal.

4. The integrated semiconductor circuit according to claim 3, wherein:

said at least one controllable switching device is a plurality of switching devices embodied as multiplexers; and each of said multiplexers is supplied with the at least first and second clock signals and connects one of the at least first and second clock signals to a respective one of said circuit units based on the random signal.

5. The integrated semiconductor circuit according to claim 2, wherein said at least one controllable clock signal generator includes a voltage controlled oscillator.

6. The integrated semiconductor circuit according to claim 2, wherein said at least one controllable clock signal generator includes a phase locked loop with a frequency divider controlled by the random signal generator.

7. The integrated semiconductor circuit according to claim 1, wherein at least one of said circuit units is an auxiliary circuit unit.

8. A method for operating a clocked integrated semiconductor circuit, the method which comprises:

executing, in circuit units of an integrated semiconductor circuit, operations which each require a respective given number of clock signal periods; and determining, based on a random signal, a further number of clock signal periods;

supplying the further number of clock signal periods to an auxiliary circuit unit having substantially a same current consumption as the circuit units; and performing the supplying step at least one of prior, during and subsequent to the executing step.

9. A method for operating a clocked integrated semiconductor circuit, the method which comprises:

executing, in a first circuit unit of an integrated semiconductor circuit, an operation which requires a given number of clock signal periods of a clock signal; and activating, during the executing step, at least a second circuit unit for a duration of time periods determined by a random signal by supplying one of the clock signal and a further clock signal to the second circuit unit.

10. The method according to claim 9, which comprises interrupting during at least one of the time periods determined by the random signal, the operation executed in the first circuit unit.

* * * * *